United States Patent [19]

Blackwood

[11] Patent Number: 4,744,583

[45] Date of Patent: May 17, 1988

[54] MOTORIZED WIDE RANGE TOW HITCH

[76] Inventor: Lloyd Blackwood, 5612 Crystal Springs Dr., Bakersfield, Calif. 93313

[21] Appl. No.: 54,805

[22] Filed: May 27, 1987

[51] Int. Cl.⁴ .............................................. B60D 1/16
[52] U.S. Cl. ............................ 280/478 B; 280/479 R
[58] Field of Search ........... 280/478 R, 478 A, 478 B, 280/479 R

[56] References Cited

U.S. PATENT DOCUMENTS 3,860,267  1/1975  Lyons .............................. 280/478 B
4,042,254  8/1977  Allen .............................. 280/478 B Primary Examiner—John J. Love
Assistant Examiner—Donn McGieham
Attorney, Agent, or Firm—Fleit, Jacobson, Cohn & Price

[57] ABSTRACT

A motorized wide range tow hitch is provided including a mount defining a rearwardly flared recess in which a front-to-rear extending ball hitch mounting arm is disposed for longitudinal shifting relative to the mount between front and rear limit positions and horizontal swinging of the rear end of the arm relative to the mount when the arm is disposed in a position rearward of its forward limit position. Motor drive structure is operatively connected between the mount and the arm for motorized forward retraction of the arm from a rearwardly displaced position to the forward limit position of the arm and the arm and mount include coacting structure for camming the arm to a centered position within the recess responsive to final movement of the arm to a forwardmost retracted limit position.

11 Claims, 3 Drawing Sheets

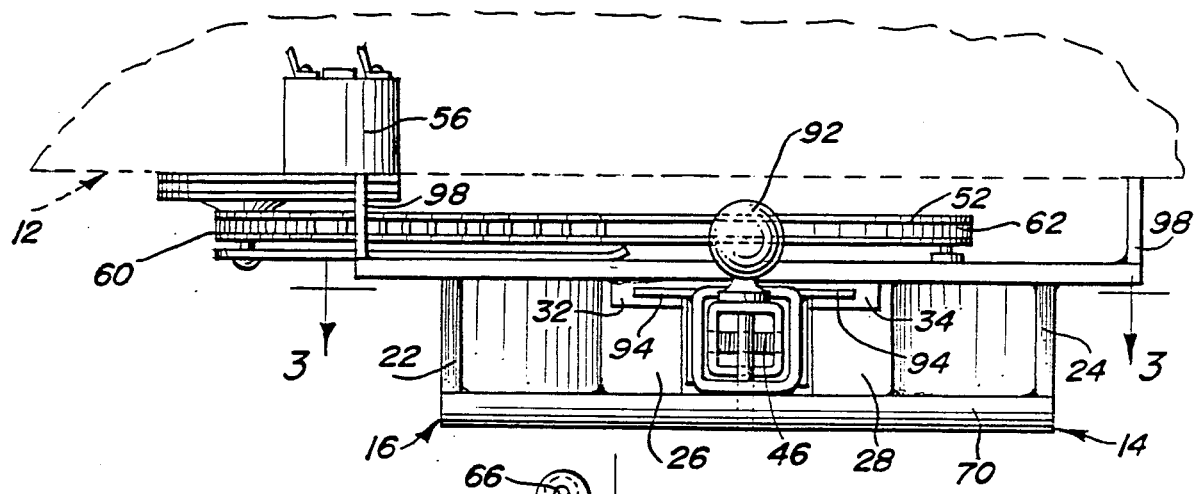
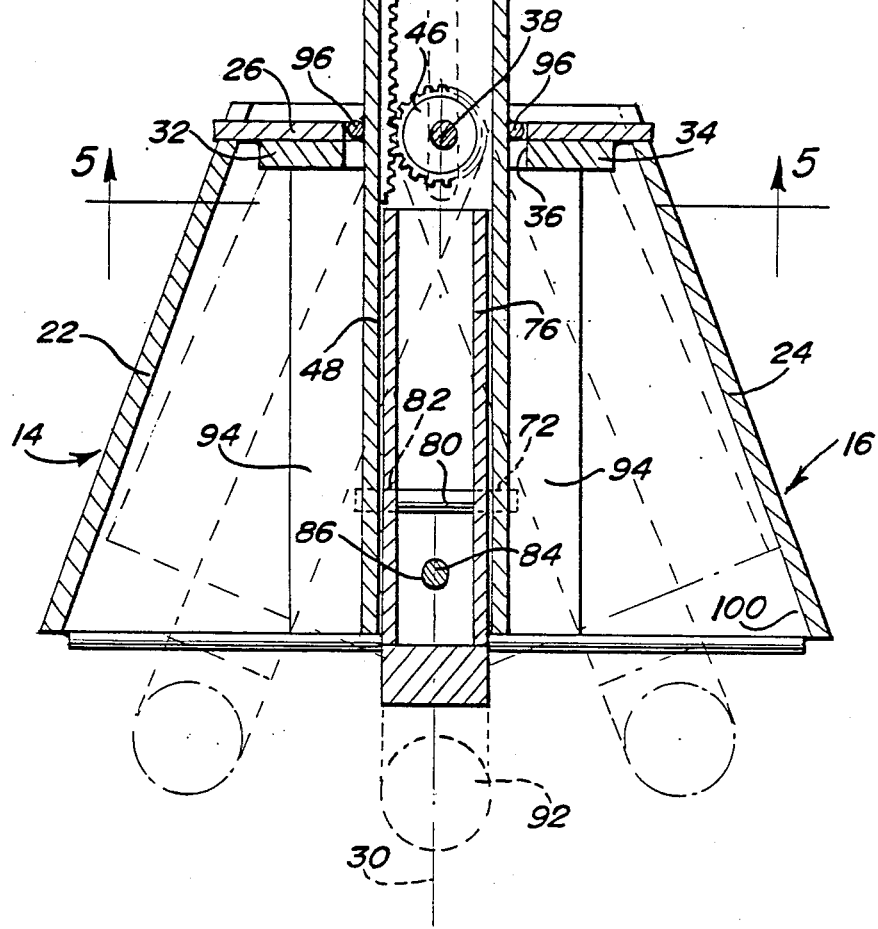

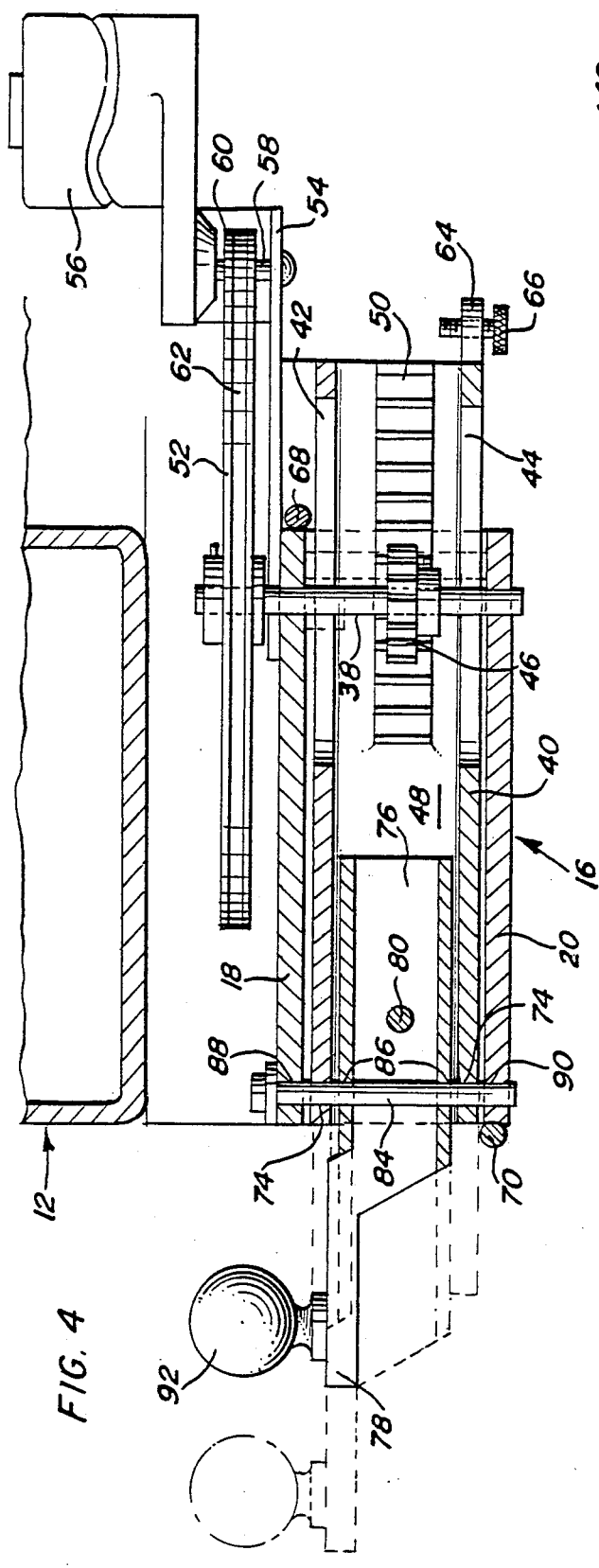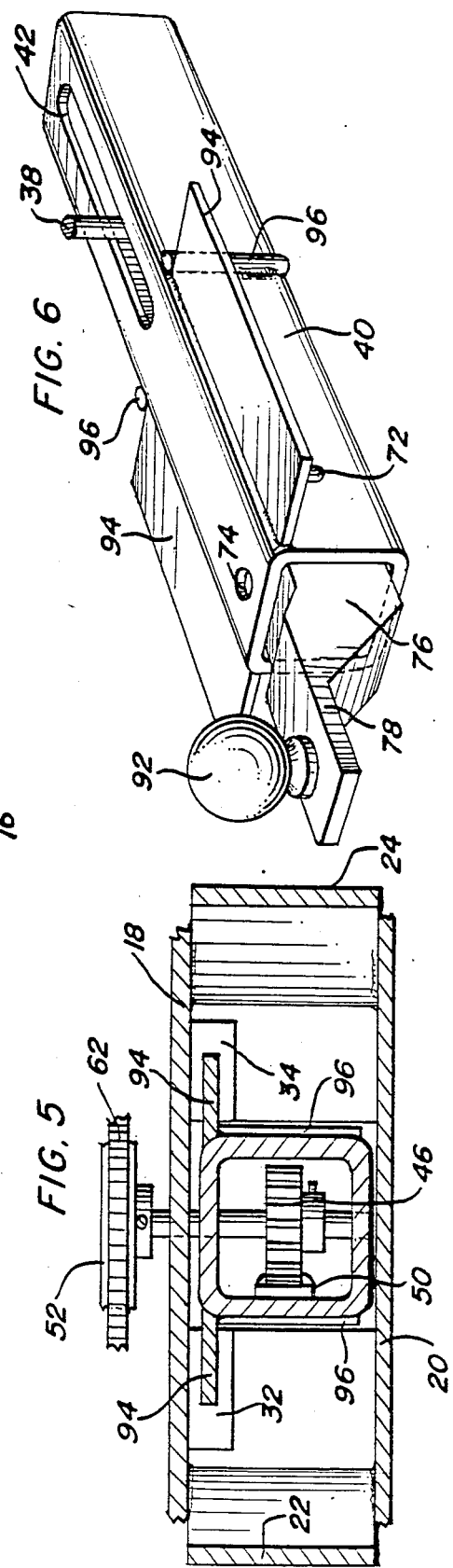

MOTORIZED WIDE RANGE TOW HITCH

BACKGROUND OF THE INVENTION

1. Field of the Invention

A hitch construction is provided of the wide range type to facilitate the coupling of a trailer to a towing vehicle with minimum "jockeying" of the towing vehicle relative to the trailer and the hitch is motorized to the extent that once a trailer has been coupled to the hitch when the latter is in wide range configuration it is merely necessary to actuate a switch controlling an electric motor so that the hitch may be transformed from a wide range operating mode to a trailering mode and thereafter locked in the trailering mode, which operations may be conveniently carried out from immediately adjacent the trailer hitch prior to the operator of the hitch returning to the operator's position of the towing vehicle and commencing the desired towing operation without further interruption.

2. Description of Related Art

Various different forms of wide range tow hitches heretofore have been provided such as those disclosed in U.S. Pat. Nos. 3,266,818, 3,521,908, 3,860,267, 4,466,632, 4,515,387 and 4,558,883. However, these previously known forms of wide range tow hitches do not include the overall combination of structural features of the instant invention which particular well adapts the invention for performing its intended function nor do they comprise motorized wide range tow hitches.

SUMMARY OF THE INVENTION

A mount is provided including vertically spaced top and bottom plates having front and rear margins and a pair of laterally spaced apart upstanding and rearwardly convergent opposite side plates are interconnected and extend between the top and bottom plates and define a rearwardly flared and opening recess therebetween bisected by a center vertical plane disposed centrally intermediate the side plates.

The mount is designed to be supported from the rear bumper of a towing vehicle and a pair of upstanding generally transversely aligned front plates spaced on opposite sides of the aforementioned plane and also interconnecting and extending between the top and bottom plates define a front to rear extending passage therebetween extending centrally through the recess and in which the aforementioned plane is generally centered. A support tube is slidably received between the top and bottom plates for front-to-rear shifting through the passage and includes upper and lower longitudinal slots through which the mid-portion of a vertically disposed drive shaft journalled from the upper and lower plates is slidably and rotatably received. A drive gear is mounted on the drive shaft within the tube and is drivingly meshed with a rack gear mounted on one inner side of the tube and the tube and mount include coacting abutment structure limiting front-to-rear longitudinal shifting of the tube through the passage.

The front end of the tube, when the latter is disposed in the rear limit position thereof, projects forwardly of the front plates and the tube, when displaced rearward of the front limit positions thereof, is swingable about the axis of rotation of the shaft transversely of the recess. Support structure is carried by the rear end of the tube for removably supporting a tow hitch therefrom and the tube and mount include coacting structure operative to cam the tube to a substantially centered position thereof within the recess and disposed in the aforementioned passage responsive to movement of the tube to the front limit position, the tube and mount including coacting releasable lock structure operative to releasably lock the tube against swinging about the axis of rotation of the shaft and rearward shifting from the front limit position thereof.

The tow hitch of the instant invention is designed for towing RV trailers as well as other forms of heavy duty trailers. The coupling structure of the hitch may be removed and the remaining portions of the hitch can be covered when usage of the hitch is not desired and the hitch is of the wide range-type to thereby enable a trailer to be more readily coupled to the hitch with a minimum of jockeying of the vehicle from which the hitch is supported. Further, the wide range hitch is motorized such that it may be transformed from a wide range mode of operation to a trailering mode of operation from a position immediately adjacent the hitch, thereby enabling the trailer coupling operation to be carried out totally independent of movement of the towing vehicle.

The tow hitch is also designed in a manner such that it may be readily mounted upon substantially all types of vehicles. In addition, the motorized tow hitch is constructed in a manner such that if the trailer to be coupled thereto is heavily laden and resting upon a soft ground surface and the towing vehicle is resting on a hard surface, after the trailer has been coupled to the hitch in the wide range mode of operation actuation the motor of the hitch for conversion of the latter from a wide range mode of operation to a trailering operation will actually pull the towing vehicle rearward toward the trailer, as long as the brakes of the towing vehicle are released and the transmission of the towing vehicle is in neutral.

The main object of this invention is to provide a wide range two hitch of the motortized type whereby the hitch may be transformed from a wide range mode of operation to a towing mode of operation from a position immediately adjacent the hitch.

Another important object of this invention is to provide a wide range tow hitch which may be conveniently mounted on various different forms of vehicles.

Still another object of this invention is to provide a tow hitch of the motorized type and which may be operated from a source of 12 volt DC current.

A further object of this invention is to provide a motorized wide range tow hitch which may be substantially concealed when the hitch is not in use.

Yet another object of this invention is to provide a wide range tow hitch having a large towing capacity.

A final object of this invention to be specifically enumerated herein is to provide a wide range tow hitch in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a rear elevational view of the assemblage illustrated in FIG. 2;

FIG. 3 is is a horizontal sectional view taken substantially upon the plane indicated by the section line 3—3 of FIG. 2;

FIG. 4 is a longitudinal vertical sectional view taken substantially along the longitudinal center line of the assemblage illustrated in FIG. 3;

FIG. 5 is a transverse vertical sectional view taken substantially upon the plane indicated by the section line 5—5 of FIG. 3;

FIG. 6 is a perspective view of the extendable and retractable portion of the tow hitch.

DESCRIPTION OF THE PREFERRED EMBODIMENT

Figure 1:
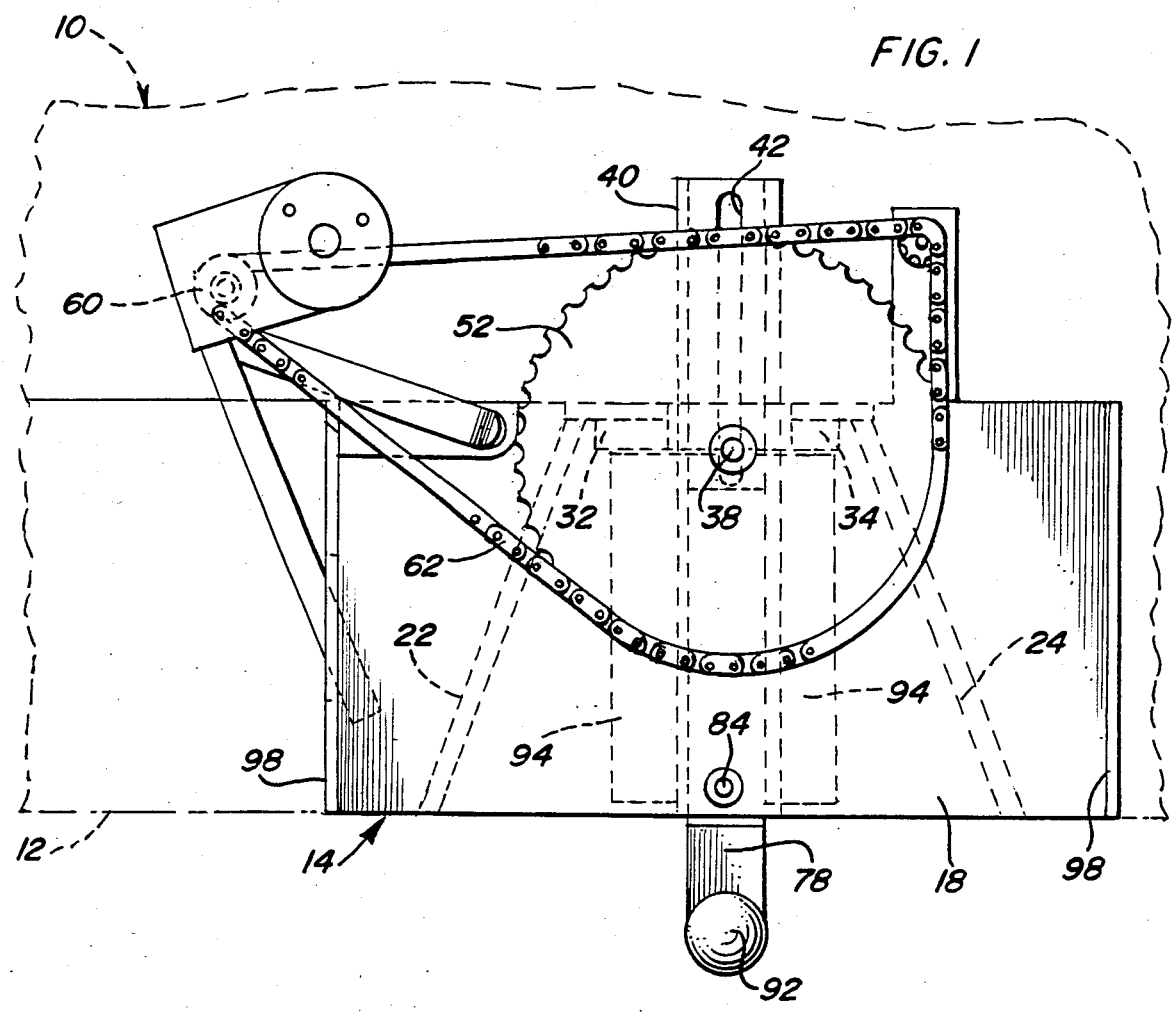
FIG. 1 is a top plan view of a tow hitch constructed in accordance with the present invention illustrated in operative association with the rear of a towing vehicle and step bumper supported therefrom shown in phantom lines.

Referring now more specifically to the drawings, the numeral 10 generally designates a conventional form of towing vehicle having a rear step bumper referred to in general by the reference numeral 12 supported therefrom. The hitch of the instant invention is referred to in general by the reference numeral 14 and is mounted from the center portion of the step bumper 12 in underslung fashion.

The hitch 14 comprises a mount referred to in general by the reference numeral 16 and including top and bottom plates 18 and 20 interconnected by rearwardly convergent upstanding opposite side plates 22 and 24 extending and secured between corresponding side marginal portions of the top and bottom plates 18 and 20. In addition, a pair of upstanding front plates 26 and 28 disposed on opposite sides of the longitudinal center line 30 of the hitch 14 extend and are secured between corresponding front marginal portions of the top and bottom plates 18 and 20. Also, opposite side abutment blocks 32 and 34 are anchored relative to the top plate 18 and the front plates 26 and 28 in laterally spaced relation on opposite sides of the longitudinal center line 30 and the abutment blocks 32 and 34 and the front plates 26 and 28 define a front-to-rear extending passage 36 through the mount 16 substantially centered relative to the longitudinal center line 30.

A drive shaft 38 extends between and is journalled from the rear marginal portions of the top and bottom plates 18 and 20 and a square support tube 40 extends through the mount 16 along the passage 36 and has upper and lower longitudinal slots 42 and 44 formed therein through which the shaft 38 extends, the shaft 38 being slidably and rotatably received through the slots 42 and 44. The shaft 38 includes a drive gear 46 mounted thereon for rotation therewith and one side wall 48 of the support tube 40 includes an inwardly facing rack gear 50 thereon with which the drive gear 46 is meshed.

The upper end of the drive shaft 38 supports a large diameter torque input pulley 52 therefrom and a mounting bracket 54 supports a gear motor 56 therefrom including a torque output shaft 58 having a torque output pulley 60 mounted thereon. An endless flexible drive member 62 is trained about the pulleys 60 and 52 and thereby drivingly connects the torque output shaft 58 to the drive shaft 38, the gear head motor 56 being of the reversable type powered by 12 volt DC current and an operating control (not shown) therefor being mounted adjacent the center portion of the bumper 12. Of course, the vehicle 10 is of the type provided with a 12 volt DC electrical system.

The forward end of the lower wall of the support tube 40 includes a forwardly projecting lug 64 through which a threaded abutment bolt 66 is adjustably secured and the abutment bolt 66 is engageable with the forward edge of the bottom plate 20 for limiting rearward movement of the support tube 40 in the passage 36. In addition, the forward edge of the top plate 18 includes a transverse round bar 68 supported therefrom and projecting slightly therebelow and the rear edge of the bottom plate 20 includes a similar round bar 70 supported therefrom and projecting slightly thereabove. The bars 68 and 70 are slidingly engaged by the upper and lower surfaces of the support tube 40 when the hitch 14 is supporting the tongue weight of an associated trailer.

The rear end portion of the support tube 40 includes a pair of opposite side transversely registered bores 72 formed therethrough as well as a further rearwardly disposed pair of vertically registered bores 74 formed therethrough. The tubular shank 76 of an elongated hitch element 78 is telescopingly receivable within the rear end of the support tube 40 and may be removably anchored in position therein through the utilization of a transverse pin 80 passed through the bores 72 and a pair of corresponding transversely registered bores 82 formed in the opposite sides of the tubular shank portion 76. Still further, a vertical latch pin 84 is downwardly receivable through the vertically registered bores 74 and corresponding vertically registered bores 86 formed in the shank portion 76 as well as corresponding verticaly registered bores 88 and 90 formed in the top and bottom plates 18 and 20.

The rear end of the hitch element 78 comprises horizontal bar stock and supports an upwardly projecting conventional hitch ball member 92 therefrom.

The rear end of the support tube 40 includes upper opposite side laterally outwardly projecting rectangular plate portions 94 supported therefrom which oppose and are engageable with the inner surfaces of the side plates 22 and 24 in a manner to be hereinafter more fully set forth and the opposite side walls of the support tube 40 include vertical round bar stock sections 96 supported therefrom snugly receivable between the opposing sides of the front plates 26 and 28. Also, the mount 16 is supported beneath the underside of the bumper 12 through the utilization of upwardly projecting spacer plates 98 projecting upwardly from the top plate 18 and welded to the underside of the bumper 12.

In operation, and assuming that the support tube 40 is in its forward limit position illustrated in FIG. 3 of the drawings, the gear head motor 56 is actuated to rearwardly displace the support tube 40 relative to the mount 16 after the pin 84 has been removed. Then, the rear end of the support tube 40 maybe swung back and forth within the rearwardly opening recess 100 defined between the side plates 22 and 24 in order to properly position the hitch ball member 92 beneath a socket coupler (not shown) supported from the tongue of a nearby trailer, the rearward extension of the support tube 40 being under the direct control of a person standing immediately adjacent the hitch 14. After the hitch ball member 92 has been properly positioned beneath such a socket coupler, the forward end of the associated trailer tongue may be lowered in order to properly engage the socket coupler with the hitch ball member 92. Then, the electric motor 56 may be actuated so as to pull the support tube 40 forward to the forward limit position thereof illustrated in FIG. 3 with the forward ends of the plates 94 abutted against the abutment blocks 34. In this position, the bores 74, 86 and 88 will be aligned and the locking pin 84 may be reinstalled. Further, the engagement of the plates 94 with the inner surfaces of the side plates 22 and 24 function to cam the support tube 40 to a centered position as the tube is moved to its forward limit position.

Figure 7:
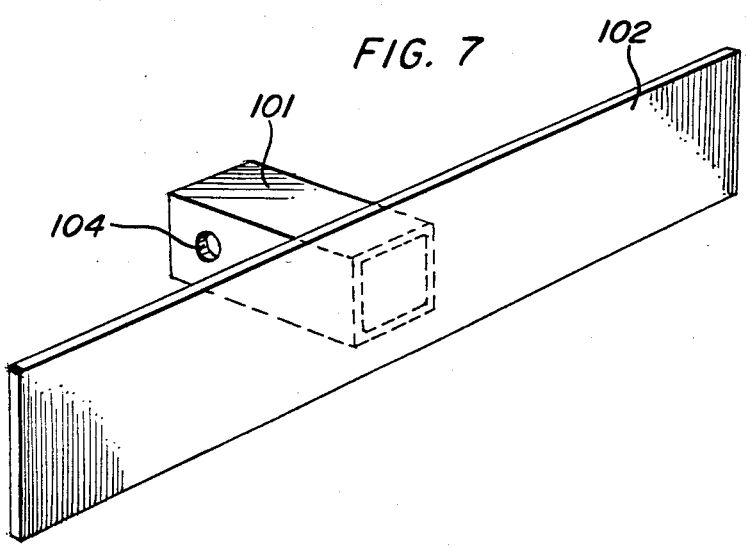
FIG. 7 is a perspective view of a cover plate which may be used to cover the rear end of the hitch after the hitch coupling member has been removed therefrom.

If the hitch 14 is not being utilized to tow a trailer, the support tube 40 may be slightly rearwardly displaced and the pins 84 and 80 may be removed. Thereafter, after again returning the support tube 40 to its forwardmost limit position, the pin 84 may be reinstalled and the tubular shank portion 101 of the cover plate 102 illustrated in FIG. 7 may be telescoped into the rear end of the support tube 40, after which the pin 80 may be reinstalled through the bores 72 and the corresponding bores 104 formed in the shank portion 100. The cover plate 102 will fully close the rear end of the mount 16.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A motorized wide range tow hitch including a mount for support from a support portion carried by the rear of a vehicle, said mount including vertically spaced top and bottom plates having front and rear margins, a pair of laterally spaced apart upstanding and forwardly convergent opposite side plates interconnecting and extending between said top and bottom plates and defining a rearwardly flared and opening recess therebetween bisected by a center vertical plane disposed centrally intermediate said side plates, a pair of upstanding generally transversely aligned front plates spaced on opposite sides of said plane and interconnecting and extending between said top and bottom plates defining a front-to-rear extending passage therebetween in which said plane is generally centered, a vertical drive shaft extending between and journalled from said top and bottom plates for rotation about an axis generally centered in said plane, an elongated front-to-rear extending support tube slidingly received between said top and bottom plates for front-to-rear shifting in said passage and including upper and lower longitudinal slots formed therein through which said drive shaft is slidingly and rotatably received, a drive gear mounted on said drive shaft within said tube and drivingly meshed with a rack gear mounted on one inner side of said tube, said tube and mount including coacting abutment means limiting front-to-rear longitudinal shifting of said tube through said passage, the front end of said tube, when the latter is disposed in the rear limit position thereof, projecting forwardly of said front plates, said tube, when displaced rearwardly of the front limit position thereof, being swingable about said axis within said recess, support means carried by the rear end of said tube for removably supporting a tow hitch therefrom, said tube and mount including coacting means operative to cam said tube to a substantially centered position thereof in said recess and bisected by said plane responsive to movement of said tube to said front limit position, said tube and mount including coacting releasable lock means operative to releaseably lock said tube against swinging about said axis and shifting rearwardly from said front limit position when said tube is in said front limit position.

2. The hitch of claim 1 including reversable electric motor means drivingly connected to said shaft.

3. The hitch of claim 2 wherein said motor means comprises a 12 V DC motor adapted to receive current from a 12 V DC battery.

4. The hitch of claim 1 wherein said support means includes a rearwardly opening socket defined by the rear end of said tube, a tow hitch member including a horizontal shank portion having first and second ends, means on said second end for supporting a hitch element therefrom, the first end of said shank portion being removably, snugly and telescopingly receivable in said socket, and releasable lock means releasably locking said second end of said shank portion in said socket.

5. The hitch of claim 1 said coacting means operative to cam said tube to a substantially centered position thereof includes outwardly projecting plate portions carried by the rear end of said tube and the inner surfaces of said side plates engageable by said plate portions upon forward movement of said tube in said recess toward said front limit position.

6. The hitch of claim 5 including reversable electric motor means drivingly connected to said shaft.

7. The hitch of claim 6 wherein said motor means comprises a 12 V DC motor adapted to receive current from a 12 V DC battery.

8. The hitch of claim 4 including a horizontally elongated edge upstanding cover plate having front and rear sides, an elongated support shank mounted from and projecting forwardly of said front side intermediate the opposite ends of said cover plate, said support shank being removably telescopingly receivable and securable within said socket upon removal of said horizontal shank portion therefrom, said cover plate being of a size and shape in horizontal elevation to substantially completely close the rear end of said recess.

9. A motorized wide range tow hitch including a mount for support from a support portion carried by the rear of a vehicle, said mount defining a rearwardly opening and rearwardly flared recess defined between substantially parallel opposing top and bottom surfaces and forwardly convergent opposite side surfaces spaced apart at their forward ends, a vertical drive shaft journalled from said mount and extending between said top and bottom surfaces, an elongated front-to-rear extending support tube slidably received between said top and bottom surfaces for front-to-rear shifting of said support tube relative to said mount and with the forward end of said support tube projecting forwardly of the spaced apart forward ends of said side surfaces, said support tube including upper and lower longitudinal slots formed therein through which said drive shaft is slidably and rotatably received, a drive gear mounted on said drive shaft within said tube and drivingly meshed with a rack gear mounted on one inner side of said tube, said tube and mount including coacting abutment means limiting front-to-rear longitudinal shifting of said tube relative to said mount, said tube, when displaced rearwardly of the front limit position thereof, being swingable about said shaft within said recess, support means carried by the rear end of said tube for removably supporting a tow hitch therefrom, said tube and mount including means operative to cam said tube to a substantially centered position thereof in said recess responsive to movement of said tube to said front limit position, said tube and mount including coacting releasable lock means operative to releasably lock said tube against shifting rearwardly from said front limit position when said tube is in said front limit position.

10. The hitch of claim 9 wherein said support means includes a rearwardly opening socket defined by the rear end of said tube, a tow hitch member including a horizontal shank portion having first and second ends, means on said second end for supporting a hitch element therefrom, the first end of said shank portion being removably, snugly and telescopingly receivable in said socket, and releasable lock means releasably locking said second end of said shank portion in said socket.

11. The combination of claim 10 including a horizontally elongated edge upstanding cover plate having front and rear sides, an elongated support shank mounted from and projecting forwardly of said front side intermediate the opposite ends of said cover plate, said support shank being removably telescopingly receivable and securable within said socket upon removal of said horizontal shank portion therefrom, said cover plate being of a size and shape in horizontal elevation to substantially completely close the rear end of said recess.

* * * * *